Patented Feb. 16, 1937

2,071,263

UNITED STATES PATENT OFFICE 2,071,263

CEMENT AND PLASTER MATERIAL

John Warne Phillips, Bridgeport, Conn., assignor of one-half to Fingal J. Lindquist, Bridgeport, Conn.

No Drawing. Application September 28, 1934, Serial No. 745,849

6 Claims. (Cl. 106—24)

This invention relates to improvements in cement and plaster products, particularly applying to those cements and plasters that set up and harden by hydration and the accompanying reactions as the class of Portland cements, calcareous plasters, and the like. Also, the various combination of these with inert fillers or extenders, etc. that may be required to produce a mortar of special character for definite purposes. The fillers may be either mineral or organic substances or a combination of the same as for example sand, asbestos, hair, cork, etc.

Preferably the improvements are caused by adding to the water required for hydration emulsified China-wood oil at the time of mixing the cement mortar. I find emulsified bodied vegetable oils and emulsified bodied fish oil can also be used but the time of their hardening is much longer than that of China-wood oil, even though driers are added. I much prefer, however, to use China-wood oil. The mixing should be thorough but this requires no extra time or labor over mixing ordinary mortar. The amount of emulsified China-wood oil used varies of course according to the properties desired in the finished product. It may range from 5 to 25% of the weight of the neat cement used, though I do not confine myself to these percentages. For most purposes ten to twenty percent of the weight of the neat cement taken covers the range used. The inert filler, unless it is excessive, is not considered in determining the amount of emulsified oil to be used.

The desirable properties conferred by the addition of emulsified vegetable oils or fish oil, and particularly China-wood oil are: dustlessness, water resistance, oil resistance, firm adherence of paint, and freedom from fine drying checks. It does not crack, break, splinter or crumble. It is hard, tough, resilient, noise reducing, and skid-proof. It resists abrasion to a marked degree and stands up under hard usage, as trucking.

Its toughness is shown by the fact that neat cement products containing this emulsified oil can be shaved with a sharp knife. Those containing sand, however, are not sectile, but are hard and tough.

The mortar is easily applied requiring no special care in its use or handling. Structural surfaces of concrete, masonry walls and the like more or less porous in character may be treated with the waterproof mortar rendering them impenetrable to moisture or acting as a moisture barrier.

Any emulsifying agent may be used that will give a satisfactory emulsion, as for example the soluble oils, the soluble soaps or any substance that will reduce the surface tension sufficiently to enable the forming of a stable emulsion.

I prefer to use triethanolamine stearate, or triethanolamine and stearic acid, though any other fatty acid as oleic acid could be used. I prefer to use triethanolamine as it does not saponify the China-wood oil but only combines with the fatty acid used to form the emulsifying agent.

An emulsion of China-wood oil mixed in a cement mortar is broken down by the cement. The oil is distributed through the mass as very small globules of oil, and interferes with the normal setting up and hardening of the mass. Hardening, however, does slowly take place as these globules gradually lose their oleaginous character and become non-oleaginous, resilient solid particles due to oxidation or other chemical changes and the mass is tough, hard and resilient. This change requires a number of weeks, perhaps two months, before the mass is thoroughly hardened, too long a time for most purposes. By adding a metallic drier to the oil before emulsifying it I found the setting time was somewhat shortened but not sufficient for practical purposes. The metallic drier no doubt acted as a catalyzer hastening the solidification of the oil globules.

By bodying the oil as by oxidizing and polymerizing the oil by blowing air through the heated oil and adding a metallic drier before emulsifying, this emulsion when mixed in a cement mortar did not interfere with the normal time of setting and hardening of the cement but added unique and valuable properties. The globules liberated in the mass became non-oleaginous, water repellent, resilient solid particles.

I prefer to prepare the oil as follows: Heat the China-wood oil approximately 170° C., blow a rapid current of air through the hot oil for about three hours maintaining the temperature during blowing at about 170° C. till the proper viscosity is reached, which is just before signs of stringing. The oil must not string. The viscosity is indicative of its state of oxidation and polymerization. Other temperatures will do, a lower temperature requires a longer time to attain the desired result and a higher temperature gives too rapid a change at the end for easy control. The viscosity can be tested from time to time on a cold glass plate, or in a bubble tube comparing it with a standard bubble tube. The blowing is stopped when the proper viscosity is reached. A metallic drier, such for example as precipitated lead resinate is added to the hot oil, an amount equal to about 10% of the weight of the oil, and stirred till dissolved and thoroughly mixed. The oil is removed from the fire when the resinate is added the heat being sufficient to cause solution. When the oil has cooled to near 100° C. stearic acid is added equal to about 9% of the weight of the oil, stirred and mixed till solution is complete. When the oil mixture has cooled to about 90° C. it is slowly poured into a solution of water and triethanolamine of normal temperature, with rapid stirring and agitation, a stable emulsion is immediately formed. The emulsion is stirred frequently but lightly while cooling. The dispersed oil particles are very small and the emulsion will keep an indefinite time. The triethanolamine dissolved in the water in weight is preferably about three percent of the weight of the oil. The amount of water taken depends on the strength of the emulsion desired, an amount of water equal to the weight of the oil is the strength preferred and the oil content is easily calculated for dilution. Stronger emulsions, if desired, for storage are satisfactory.

I do not wish to confine myself to the above method of preparing this oil and emulsion. It is given as an example of an emulsion that gives satisfactory results.

Unoxidized and unpolymerized China-wood oil may be emulsified as above disclosed using the same proportions of stearic acid, triethanolamine and water. The oil is only slightly heated to hasten this solution of the stearic acid. If a metallic drier is added the oil must be heated sufficiently to incorporate it before emulsification. This emulsion is useful for some purposes but not where quick setting and hardening are desired.

I do not wish to confine myself to the use of lead resinate as a metallic drier. I may use any of the metallic driers used in paints and varnishes or a combination of them, as for example the tungates, resinates, naphthenates, etc., usually of the metals cobalt, lead and manganese. I do not wish to limit myself to the amount of drier mentioned in the above example, 10% of the oil taken. I may use a larger or a smaller amount as conditions require. A definite amount of a combination of driers may be more effective than a larger amount of a single drier.

In practice the emulsified oxidized and polymerized China-wood oil containing the metallic drier is added to the water required for hydrating the mixture of cement and inerts before it is added to the cement aggregate and all mixed thoroughly together. The mixing may be done either by hand or machine and the resulting mix handled in the usual way. For example, with neat cement requiring approximately 33% of water for hydration if we wish to make a product containing emulsified oil equal to 20% of the weight of the neat cement, the water used for hydrating must contain approximately 20 lbs. of emulsified oil for every 33 lbs. of water. The emulsion used is composed of approximately 50% oil and 50% water. The water contained in the emulsion is part of the water used for hydration. If we mix 40 lbs. of the emulsion with 13 lbs. of water it gives the required mix for hydration, giving a product having the desired properties containing 20% of emulsified oil. This product is hard and tough, does not crack or splinter, is dustless and waterproof. It is an excellent product for patching broken cement, filling up cracks or for any other purpose its properties would suggest.

If inerts are mixed with the cement the percentage of oil is usually based on the neat cement content, as the cement merely fills up the voids of the inerts. Such mixtures require more water for hydration as the inerts have to be moistened but the percentage on the whole is less.

For example, a mixture of 100 lbs. of cement and 100 lbs. of sand may require 24% of water to give the proper consistency to the resultant mortar which would be 48 lbs. of water. To give the neat cement the same properties as above would still require 20 lbs. of emulsified oil, thus 40 lbs. of the emulsion mixed with 28 lbs. of water is required for hydrating the cement and sand mixture.

This product is hard and tough, will not crack, splinter or crumble; resists abrasion, will stand up under severe service, as trucking, etc. It is dustless, and waterproof, and can be used for floors, water barriers, mortar for masonry, etc.

It is not necessary to mix the water and emulsion for each batch. A supply may be made up, as each batch is brought to the same consistency, fairly uniform results are obtained.

The above are given as examples. I do not wish to limit myself to the proportions contained therein, and I may use any inerts or combinations of inerts that will form a product having the properties required.

As for example, a mixture of cement, granulated cork, and asbestos with about 20% content of emulsified oxidized and polymerized China-wood oil containing a suitable amount of metallic drier gives a resilient product that does not crack or crumble, and is water and oil resistant. It is tough and withstands abrasion to a marked degree. When laid on concrete floors, to which it firmly adheres, it furnishes a floor covering that is as resilient as heavy linoleum. It may be waxed, varnished, painted or used in its natural state or color. It has insulating properties due to its composition, and noise and sound diminishing properties due to its resiliency.

The addition of cork and asbestos materially reduces the density of the product, nearly doubling the volume of the cement.

Repairs are easily made, worn and broken parts being removed and replaced with new material.

Its composition, as for example, may be; parts by weight, 100 parts cement, 10 parts short fibre asbestos, 6 parts of granulated cork, preferably the cork particles are between twenty and thirty mesh, and twenty parts of emulsified oxidized and polymerized China-wood oil containing 10% of precipitated lead resinates. It is mixed and applied as the ordinary cement mixtures. Adherence to concrete surfaces is obtained by moistening the surface with the oil emulsion, lightly sprinkling neat cement over it and applying the mixture to this moist surface. The material hardens over night sufficiently for light service. The material may be pigmented as desired using those pigments that are compatible with the mix. All of these cement and plaster products containing the emulsified oil may be pigmented by using those pigments that are compatible with the mix.

I do not limit myself to the above inerts or proportions of the same, nor to the size of the cork particles. Its composition and proportions may be changed to best serve the purpose for which it is made.

For insulation and sound proofing its effectiveness is greatly increased by the addition of more cork and asbestos, some sand may also be added to increase this rigidity of the lightened mass.

The emulsified oxidized and polymerized China-wood oil containing the metallic drier may be used as a vehicle for cement paint employed as a waterproofing and protective coating.

I have found that a considerable percentage of oil soluble gums, resins, either natural or synthetic, pitches, asphalt, etc. if dissolved in the oil may be emulsified with the oil when desired for special purposes. When used they are dissolved in the oil with the metallic resinate just before emulsification.

The resinous content is effective when the emulsion is used as a vehicle for concrete paint, also in adding firmness to the light insulating and sound proofing products.

The emulsified oil may be mixed in calcareous plasters as plaster of Paris, etc. to render the resulting plasture moisture proof and to permit its use as a moisture barrier.

Although I have described the invention and given examples with reference principally to emulsified China-wood oil, as indicated above I am not limited to the use of China-wood oil but may use emulsified bodied vegetable oils and emulsified bodied fish oil, but I much prefer to use China-wood oil.

Having thus set forth the nature of my invention, what I claim is:

1. A method of making a composition comprising mixing China-wood oil with a metallic drier, emulsifying the oil, mixing with water, and then mixing with a powdered cement.

2. A method of making a composition comprising oxidized and polymerizing China-wood oil by heating and blowing with air, mixing a metallic drier with the polymerized oil, then emulsifying the oil, mixing with water, and then mixing with powdered cement.

3. A method of making a composition comprisng heating China-wood oil to approximately 170° C., blowing the heated oil with air for about three hours, adding about 10% by weight of a metallic drier, cooling the oil and stirring and agitating with water and a soluble soap, and mixing with a powdered cement.

4. A method of making a composition comprising oxidizing and polymerizing China-wood oil by heating and blowing with air, mixing a metallic drier with the oxidized and polymerized oil, mixing and agitating with water and a soluble soap, and then mixing with a powdered cement hardenable by hydration.

5. A method of making a composition comprising heating China-wood oil and blowing with air to polymerize it, adding a metallic drier, adding stearic acid, mixing and stirring with a solution of triethanolamine in water, and mixing with a powdered cement.

6. A method of making a composition comprising heating China-wood oil and blowing it with air, adding stearic acid, mixing and stirring with a solution of triethanolamine and water, and mixing with a powdered cement hardenable by hydration.

JOHN WARNE PHILLIPS.

CERTIFICATE OF CORRECTION.

Patent No. 2,071,263.　　　　　　　　　　　　　　　　　　　　February 16, 1937.

JOHN WARNE PHILLIPS.

It is hereby certified that error appears in the printed specification of the above numbered patent requiring correction as follows: Page 3, second column, line 2, claim 2, for "oxidized" read oxidizing; and that the said Letters Patent should be read with this correction therein that the same may conform to the record of the case in the Patent Office.

Signed and sealed this 14th day of September, A. D. 1937.

Henry Van Arsdale (Seal)　　　　　　　　　　　　　　　　　　Acting Commissioner of Patents.